United States Patent

[11] 3,553,342

| [72] | Inventor | Michael Savvas Papadopulos<br>Longfield, England |
|---|---|---|
| [21] | Appl. No. | 705,068 |
| [22] | Filed | Feb. 13, 1968 |
| [45] | Patented | Jan. 5, 1971 |
| [73] | Assignee | British Insulated Callender's Cables<br>Limited<br>London, England |
| [32] | Priority | Feb. 14, 1967 |
| [33] | | Great Britain |
| [31] | | No. 6,941/67 |

[54] ELECTRIC CABLE INSTALLATIONS AND JOINTS THEREFOR
18 Claims, 3 Drawing Figs.

[52] U.S. Cl. .................................................. 174/15, 174/21, 174/25
[51] Int. Cl. ..................................................... H01b 7/34
[50] Field of Search........................................... 174/15, 15C, 19—23, 74, 84, 14, 16; 165/(Elect Digest)

[56] References Cited
UNITED STATES PATENTS

| 3,111,551 | 11/1963 | D'Ascoci...................... | 174/15 |
| 3,406,245 | 10/1968 | Watkins ........................ | 174/15 |
| 2,163,783 | 7/1939 | Fisher............................ | 174/15 |
| 2,053,163 | 9/1936 | Phillips.......................... | 174/21 |
| 1,979,150 | 10/1934 | Emanueli ....................... | 174/25 |

FOREIGN PATENTS

| 1,076,355 | 7/1967 | Great Britain................ | 174/22 |

Primary Examiner—Lewis H. Myers
Assistant Examiner—A. T. Grimley
Attorney—Buell, Blenko and Ziesenheim ABSTRACT: In a joint for an electric power cable, especially a fluid-filled cable, short lengths of cable adjacent to the built-up joint structure are cooled by circulating fluid. The short lengths, which may be sheathed or unsheathed, may project into an elongated fluid-tight enclosure surrounding the joint structure and through which dielectric fluid circulates. Alternatively supplementary enclosures for the short lengths may be located adjacent to the main enclosure and fluid circulated through the supplementary enclosures and a heat exchanger or exchangers.

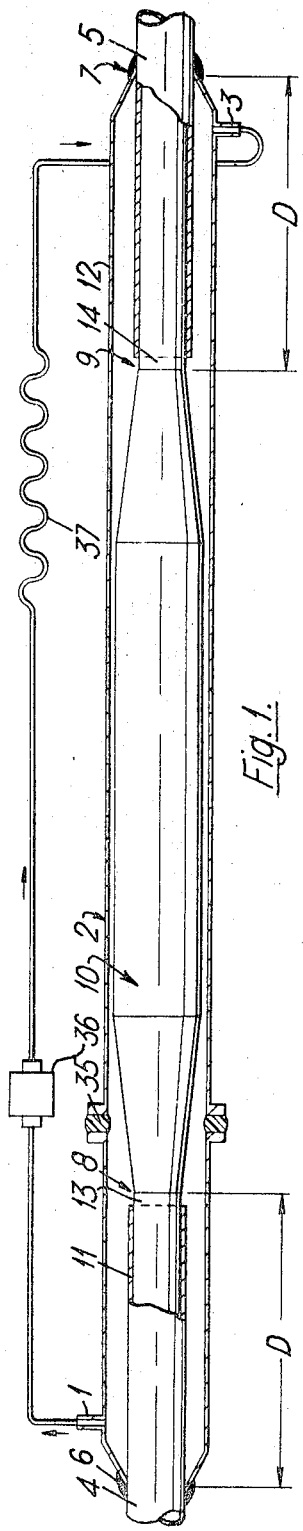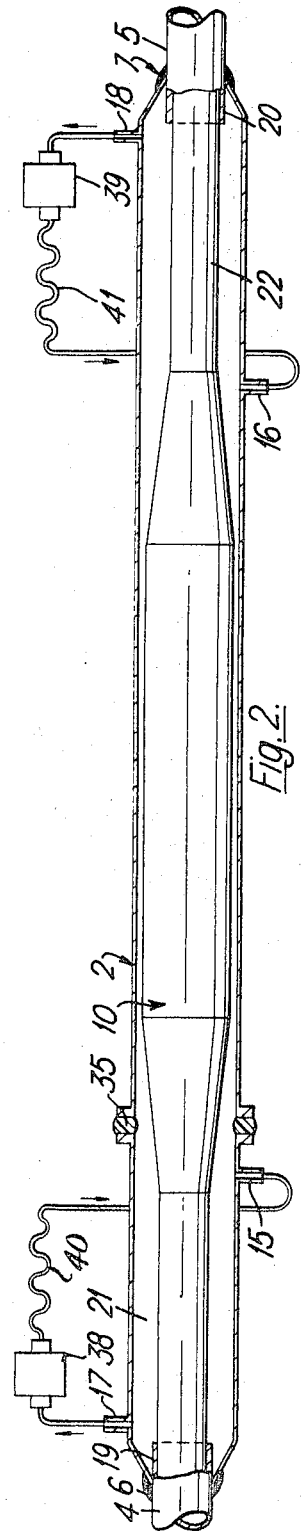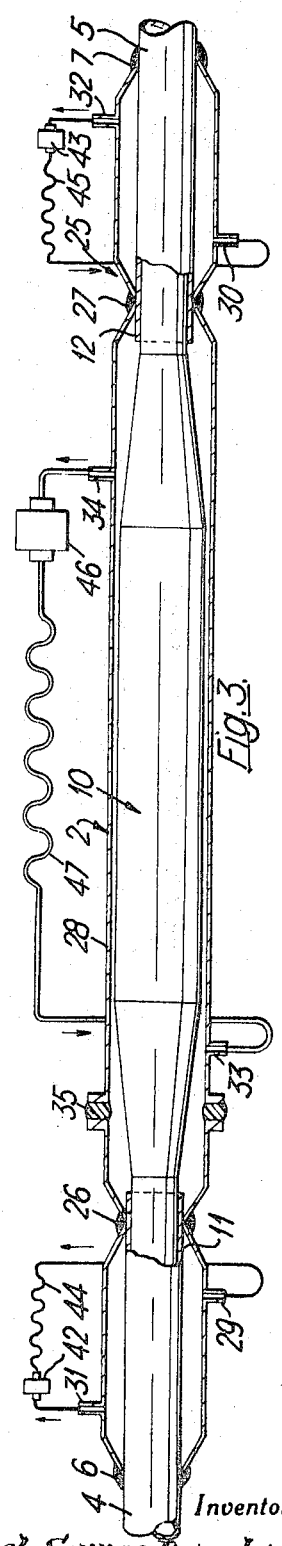
Inventor
Michael Savvas Papadopulos
By
Attorney

ELECTRIC CABLE INSTALLATIONS AND JOINTS THEREFOR

This invention relates to joints for sheathed electric power cables and to electric power cable installations incorporating such joints. The invention is especially, but not exclusively, applicable to joints for sheathed cables of the kind known as "fluid filled cables" in which the dielectric comprises a fluid, for example oil-filled cables, gas-filled cables and impregnated pressure cables. At all joints in such cables, escape of the dielectric fluid is prevented by a fluid-tight enclosure sealed to the sheaths of the cable lengths connected at the joint. At stop joints the enclosure is divided by a fluid-tight barrier into two parts, one associated with each of the cable lengths. In the following paragraphs, the term "enclosure" will, where appropriate, refer also to each part of a stop joint enclosure.

In accordance with the present invention, a short length of cable adjacent to a cable joint is surrounded by a fluid-tight enclosure through which a cooling fluid circulates, the fluid also circulating through external cooling means for the fluid. The term "short length of cable" as used herein means a length of cable in which the original cable dielectric remains intact and which is equal to several times the cable diameter, that is to say only a small proportion of the distance between adjacent joints of the cable installation but considerably greater than the length that normally projects into a joint enclosure; it does not include any part of a cable core to which supplementary insulation has been applied as part of the joint structure; the length may be sheathed or unsheathed or partly sheathed and partly unsheathed.

When the dielectric fluid is a liquid, it may be allowed to circulate by convection from an outlet pipe connected to an upper part of the fluid-tight enclosure, through a heat exchanger for example a radiator exposed to the atmosphere, and back into the enclosure through an inlet pipe connected to a lower part of the enclosure, but forced circulation can also be used.

Three embodiments of the present invention will hereinafter be described by way of example with reference to the accompanying drawing in which FIGS. 1, 2 and 3 are respectively diagrammatic cross-sectional elevations of three joints for sheathed power cables.

The distance that a cable sheath projects into a joint enclosure is normally the minimum distance necessary to protect the cable dielectric from damage during the plumbing of the joint enclosure onto the sheath at the entry gland. The distance that the exposed cable core projects from the sheath (between the end of the sheath and the commencement of the built-up dielectric surrounding the connection between the cable conductors) is normally only sufficient to enable a good electrical connection to be made to the dielectric screen, e.g. 1—2 inches. The normal overall distance from the cable entry gland to the point where insulation of the cable core is supplemented by dielectric material extending over the connection between the cable conductors will vary in accordance with the size and type of cable but it is believed that 9 inches is the absolute maximum that has previously been used. The 'short lengths' of cable in accordance with the present invention are preferably at least one cable diameter in excess of 9 inches.

My preferred method of applying the present invention is by extending a joint enclosure along the cable axis to an extent such that it not only surrounds the connection between the cable conductors but also a short length of cable adjacent to the joint of the or each cable. Referring to FIG. 1, dielectric fluid is caused to circulate by a pump 36 through a single outlet pipe 1 emerging from one end of the extended enclosure 2, through a heat exchange primary coil 37 and back into the opposite end of the extended enclosure through a single inlet pipe 3.

It will be seen that the distances 'D' between the points of entry of the cables 4 and 5 into the enclosure 3 at the plumbed glands 6 and 7 and the points 8 and 9 where the built-up insulation 10 commences are each about five times the cable diameter. The cable sheaths 11 and 12 extend over the greater part of this distance, leaving only small lengths 13 and 14 of the dielectric screens exposed but an alternative possibility is to cut back the sheaths in the normal way and leaving equivalent lengths of the dielectric screens 13 and 14 exposed.

FIG. 2 shows a modified form of the joint shown in FIG. 1 in which the dielectric fluid is caused to circulate by pumps 38, 39 only around the short lengths of cable adjacent to the joint. Two inlet pipes 15 and 16 and two outlet pipes 17 and 18 are provided, the pipes 15 and 17 being connected to one heat exchanger primary coil 40 and the pipes 16 and 18 being connected to another heat exchanger primary coil 41.

Although it is preferable not to remove the cable sheath from the short length of cable surrounded by the extended joint enclosure, to illustrate the alternative possibility, the sheaths 19, 20 in FIG. 2 are shown cut back in the normal way leaving lengths 21, 22 of the cable cores covered by the dielectric screens exposed.

In both examples so far described the extensions of the enclosure are integral with and of the same diameter as the remainder of the enclosure. They may alternatively be attached to the main part of the enclosure and/or of smaller diameter. The extended parts of the enclosure may if necessary each be supported on the cable sheath at both ends of the short length of cable or each supported continuously along the short length of the cable which it surrounds, for example by a helical barrier which provides for even distribution of the circulating oil around the cable sheath. This latter form of enclosure can in effect be constituted by a helical pipe closely fitting around the cable sheath and forming an inlet or outlet pipe for a joint enclosure of normal length.

In the joint shown in FIG. 3, instead of extending the joint enclosure, supplementary enclosures 24 and 25 are provided around each cable 4, 5 adjacent to its point of entry 26, 27 into a normal joint enclosure 28. These supplementary enclosures are each provided with separate inlet pipes 29, 30 and outlet pipes 31, 32 which can be connected in the same fluid circulating system as is used for cooling the joint enclosure 28 or, as shown provided with separate circulating systems including pumps 42, 43 connected to separate heat exchangers 44, 45, or to separate primary coils of a heat exchanger 47 used for the main joint enclosure 28 and connected to a pump 46 and to inlet and outlet pipes 33, 34. When such supplementary enclosures are used and they are connected to separate heat exchangers, the cooling fluid may be the same as or a different cooling fluid from that used for cooling the joint enclosure.

The joint enclosures described by way of example are all intended for use in crossbonded systems and to this end are transversely divided by insulating rings 35. The joints shown in FIGS. 2 and 3 are particularly suitable for use in such systems when separate heat exchangers are used for each end part of the main enclosure or each supplementary enclosure.

As already indicated it will normally be preferable not to remove the cable sheath from the short length of cable surrounded by the extended joint enclosure or by the supplementary enclosure but in some circumstances it may be found convenient to remove the sheath from the short length and thus expose the screened cable dielectric to the cooling fluid. It will be appreciated that if the latter alternative is used in an arrangement as shown in FIG. 3, the same fluid must be used in the supplementary enclosures as in the main enclosure since the main and supplementary enclosures could not effectively be sealed one from the other.

In some circumstances cooling fluid may be circulated only through the supplementary enclosures and not through the enclosure for the connection between the cable conductors. Such an arrangement is applicable to cables other than fluid filled cables and can readily be applied to cable installations which are already installed and which need supplementary cooling of the joints to upgrade their load carrying capacity.

Separate circulating systems may be provided for the two parts of a stop joint or barrier joint. Each of these enclosures may be extended as described above or each may be associated with a supplementary enclosure through which the same or a different cooling fluid circulates.

I claim:

1. A joint in a sheathed electric power cable comprising an enclosure sealed at at least one end to the cable sheath, and surrounding a short length of cable adjacent to the joint, cooling fluid for the cable which circulates through the enclosure external cooling means for the fluid and means for causing the fluid to circulate through the enclosure and through the external cooling means.

2. A joint as claimed in claim 1 in which each of the short lengths of cable is greater than 9 inches plus one cable diameter.

3. A joint as claimed in claim 1 in which each of the short lengths of cable is sheathed over the greater part of its length.

4. A joint as claimed in claim 1 in which the cooling fluid for each short length is caused to circulate by convection.

5. A joint as claimed in claim 1 in which the cable is a fluid filled cable and the cooling fluid for cooling each short length of cable is the dielectric fluid of the cable.

6. A joint is in a sheathed electric power cable comprising a fluid-tight enclosure sealed to the sheaths of cable lengths connected at the joint and enclosing the connection between the cable conductors, the enclosure being extended at at least one end to enclose a short length of the cable, cooling fluid for the cable which circulates through each extended part of the enclosure and means for causing said cooling fluid to circulate through each extended part of the enclosure and through external cooling means for the fluid.

7. A joint as claimed in claim 6 in which each extended end part of the enclosure is of smaller cross section than the central part of the enclosure.

8. A joint as claimed in claim 6 in which each of the short lengths of the cable is greater than 9 inches plus one cable diameter.

9. A joint as claimed in claim 6 in which each of the short lengths of cable is sheathed over the greater part of its length.

10. A joint as claimed in claim 6 in which the cooling fluid for each short length is caused to circulate by convection.

11. A joint as claimed in claim 6 in which the cable is a fluid filled cable and means is provided for causing the dielectric fluid to circulate through the whole length of the enclosure, including each extended part of the enclosure, and through external cooling means for the fluid.

12. A joint in a sheathed electric power cable comprising a fluid-tight enclosure sealed to the sheaths of cable lengths connected at the joint and enclosing the connection between the cable conductors and, surrounding a short length of the cable adjacent to at least one end of said enclosure, a supplementary fluid-tight enclosure, cooling fluid for the cable which circulates through said supplementary fluid-tight enclosure, external cooling means for the fluid and means for causing the fluid to circulate through said supplementary enclosure and the external cooling means.

13. A joint as claimed in claim 12 in which each of the short lengths of cable is greater than 9 inches plus one cable diameter.

14. A joint as claimed in claim 12 in which each of the short lengths of cable is sheathed over the greater part of its length.

15. A joint as claimed in claim 12 in which the cooling fluid for each short length is caused to circulate by convection.

16. A joint as claimed in claim 12 in which the cable is a fluid filled cable and the cooling fluid for cooling each short length of cable is the dielectric fluid of the cable.

17. A joint as claimed in claim 12 for a cross bonded cable system in which supplementary enclosures at each end of the joint are electrically isolated from each other and separate external cooling means are provided for each enclosure.

18. A joint as claimed in claim 12 in which the cooling fluid which circulates through the or each supplementary enclosure is different from a dielectric fluid filling the fluid-tight enclosure enclosing the connection between the cable conductor.